(12) United States Patent
Donneau-Golencer et al.

(10) Patent No.: US 9,893,905 B2
(45) Date of Patent: Feb. 13, 2018

(54) COLLABORATIVE PLATFORM FOR TEAMS WITH MESSAGING AND LEARNING ACROSS GROUPS

(71) Applicant: Tempo AI, Inc., Menlo Park, CA (US)

(72) Inventors: Thierry Donneau-Golencer, Menlo Park, CA (US); Rajan Singh, Menlo Park, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 598 days.

(21) Appl. No.: 14/079,454

(22) Filed: Nov. 13, 2013

(65) Prior Publication Data
US 2015/0135094 A1 May 14, 2015

(51) Int. Cl.
G06F 3/048 (2013.01)
H04L 12/18 (2006.01)

(52) U.S. Cl.
CPC ................ *H04L 12/1886* (2013.01)

(58) Field of Classification Search
None
See application file for complete search history.

(56) References Cited

U.S. PATENT DOCUMENTS

| | | | |
|---|---|---|---|
| 2,454,039 A | 11/1948 | Cox | |
| 2,484,865 A | 10/1949 | Strickland, Jr. | |
| 2,493,785 A | 1/1950 | Strickland, Jr. | |
| 2,598,694 A | 6/1952 | Kerbenar | |
| 2,657,301 A | 10/1953 | Kincaid | |
| 2,971,160 A | 3/1954 | Segsworth | |
| 2,714,647 A | 8/1955 | Good | |
| 2,819,370 A | 1/1958 | Osborn, Jr. | |
| 3,051,812 A | 8/1962 | Gschwender | |
| 3,143,628 A | 8/1964 | Golden | |
| 3,502,310 A | 3/1970 | Coffman | |
| 3,601,571 A | 8/1971 | Curcio | |
| 3,775,831 A | 12/1973 | Cachat | |
| 4,021,274 A | 5/1977 | Chadwick | |
| 4,673,785 A | 6/1987 | Damiani | |
| 5,438,660 A | 8/1995 | Lee | |
| 5,577,188 A | 11/1996 | Zhu | |
| 5,608,872 A | 3/1997 | Schwartz et al. | |
| 5,649,104 A | 7/1997 | Carleton et al. | |
| 5,664,109 A | 9/1997 | Johnson | |
| 5,715,450 A | 2/1998 | Ambrose et al. | |
| 5,761,419 A | 6/1998 | Schwartz et al. | |
| 5,774,867 A | 6/1998 | Fitzpatrick | |
| 5,819,038 A | 10/1998 | Carleton et al. | |
| 5,821,937 A | 10/1998 | Tonelli et al. | |
| 5,831,610 A | 11/1998 | Tonelli et al. | |

(Continued)

FOREIGN PATENT DOCUMENTS

GB 502152 3/1939

OTHER PUBLICATIONS

"Google Plus Users", Google+Ripples; Oct. 31, 2011; 3 pages.
(Continued)

*Primary Examiner* — William Trapanese
(74) *Attorney, Agent, or Firm* — Schwabe Williamson & Wyatt (57) ABSTRACT

The present disclosure extends to methods, systems, and computer program products for providing collaboration among users within a group for improved communication and scheduling.

21 Claims, 7 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Formukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,480,830 B1 | 11/2002 | Ford |
| 6,513,063 B1 | 1/2003 | Julia |
| 6,523,061 B1 | 2/2003 | Halverson |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,738,767 B1 | 5/2004 | Bhatt |
| 6,742,021 B1 | 5/2004 | Halverson |
| 6,754,681 B2 | 6/2004 | Brodersen et al. |
| 6,757,718 B1 | 6/2004 | Halverson |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,036,128 B1 | 4/2006 | Julia |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,113,797 B2 | 9/2006 | Kelley |
| 7,139,722 B2 | 11/2006 | Perella |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,340,484 B2 | 3/2008 | S |
| 7,343,365 B2 | 3/2008 | Farnham |
| 7,356,482 B2 | 4/2008 | Frankland et al. |
| 7,370,282 B2 | 5/2008 | Cary |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,509,388 B2 | 3/2009 | Allen |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,809,599 B2 | 10/2010 | Andrew |
| 7,827,208 B2 | 11/2010 | Bosworth et al. |
| 7,840,543 B2 | 11/2010 | Guiheneuf |
| 7,853,881 B1 | 12/2010 | Aly Assal et al. |
| 7,904,321 B2 | 3/2011 | Moore |
| 7,945,653 B2 | 5/2011 | Zukerberg et al. |
| 7,958,003 B2 | 6/2011 | De Vries |
| 7,979,319 B2 | 7/2011 | Toulotte |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,032,508 B2 | 10/2011 | Martinez |
| 8,060,567 B2 | 11/2011 | Carroll |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,244,821 B2 | 8/2012 | Carroll |
| 8,275,836 B2 | 9/2012 | Beaven et al. |
| 8,280,984 B2 | 10/2012 | Lance |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,682,736 B2 | 3/2014 | Flake |
| 8,799,826 B2 | 8/2014 | Missig |
| 8,805,833 B2 | 8/2014 | Nath |
| 8,849,806 B2 | 9/2014 | Walker |
| 8,918,431 B2 | 12/2014 | Mark |
| 9,471,666 B2 | 10/2016 | Singh |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |

(56) References Cited

U.S. PATENT DOCUMENTS

| | | |
|---|---|---|
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0101169 A1 | 5/2003 | Bhatt |
| 2003/0120675 A1 | 6/2003 | Stauber et al. |
| 2003/0135565 A1* | 7/2003 | Estrada ............... G06Q 10/107 709/206 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0138944 A1 | 7/2004 | Whitacre et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0027805 A1 | 2/2005 | Aoki |
| 2005/0050555 A1 | 3/2005 | Exley et al. |
| 2005/0091098 A1 | 4/2005 | Brodersen et al. |
| 2005/0114777 A1 | 5/2005 | Szeto |
| 2005/0197954 A1 | 9/2005 | Maitland |
| 2006/0085436 A1 | 4/2006 | Dettinger |
| 2006/0089945 A1 | 4/2006 | Paval |
| 2006/0190833 A1 | 8/2006 | SanGiovanni |
| 2006/0212330 A1 | 9/2006 | Savilampi |
| 2006/0245641 A1 | 11/2006 | Viola |
| 2007/0198648 A1 | 8/2007 | Allen |
| 2007/0219875 A1 | 9/2007 | Toulotte |
| 2007/0244976 A1 | 10/2007 | Carroll |
| 2008/0094205 A1 | 4/2008 | Thorn |
| 2008/0140498 A1 | 6/2008 | Setty |
| 2008/0148181 A1 | 6/2008 | Reyes |
| 2008/0195705 A1* | 8/2008 | Lee ................... G06Q 10/1095 709/204 |
| 2008/0249972 A1 | 10/2008 | Dillon |
| 2009/0063415 A1 | 3/2009 | Chatfield et al. |
| 2009/0070322 A1 | 3/2009 | Salvetti |
| 2009/0100342 A1 | 4/2009 | Jakobson |
| 2009/0106224 A1 | 4/2009 | Roulland |
| 2009/0125817 A1* | 5/2009 | O'Sullivan .......... G06Q 10/109 715/753 |
| 2009/0177744 A1 | 7/2009 | Marlow et al. |
| 2009/0259670 A1 | 10/2009 | Inmon |
| 2009/0307162 A1 | 12/2009 | Bui |
| 2010/0004971 A1 | 1/2010 | Lee |
| 2010/0030715 A1 | 2/2010 | Eustice |
| 2010/0069035 A1 | 3/2010 | Johnson |
| 2010/0122190 A1 | 5/2010 | Lu |
| 2010/0162105 A1 | 6/2010 | Beebe |
| 2010/0179961 A1 | 7/2010 | Berry |
| 2010/0180200 A1 | 7/2010 | Donneau-Golencer |
| 2011/0099189 A1 | 4/2011 | Barraclough |
| 2011/0218958 A1 | 9/2011 | Warshavsky |
| 2011/0239158 A1 | 9/2011 | Barraclough |
| 2011/0247051 A1 | 10/2011 | Bulumulla et al. |
| 2011/0295612 A1 | 12/2011 | Donneau-Golencer |
| 2012/0042218 A1 | 2/2012 | Cinarkaya |
| 2012/0066393 A1 | 3/2012 | Tekwani |
| 2012/0124153 A1 | 5/2012 | Carroll |
| 2012/0131020 A1 | 5/2012 | Nitz |
| 2012/0158472 A1 | 6/2012 | Singh |
| 2012/0173464 A1 | 7/2012 | Tur |
| 2012/0191501 A1 | 7/2012 | Olliphant |
| 2012/0233137 A1 | 9/2012 | Jakobson et al. |
| 2012/0233531 A1 | 9/2012 | Ma |
| 2012/0234824 A1 | 9/2012 | Nakatsu |
| 2012/0290407 A1 | 11/2012 | Hubbard et al. |
| 2012/0297312 A1 | 11/2012 | Lance |
| 2012/0297321 A1 | 11/2012 | Douglas |
| 2013/0024924 A1 | 1/2013 | Brady |
| 2013/0036369 A1 | 2/2013 | Mitchell |
| 2013/0066921 A1 | 3/2013 | Mark et al. |
| 2013/0110842 A1 | 5/2013 | Donneau-Golencer |
| 2013/0185336 A1 | 7/2013 | Singh |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0035949 A1 | 2/2014 | Singh |
| 2014/0046876 A1 | 2/2014 | Zhang |
| 2014/0136612 A1* | 5/2014 | Redfern ................. G06Q 50/01 709/204 |
| 2014/0143685 A1 | 5/2014 | Rekhi |
| 2014/0164510 A1 | 6/2014 | Abuelsaad |
| 2014/0225897 A1 | 8/2014 | Sarrazin |
| 2014/0359537 A1 | 12/2014 | Jakobson et al. |
| 2015/0135095 A1 | 5/2015 | Donneau-Golencer |

OTHER PUBLICATIONS

Heidorn, "Natural Language Dialogue for Managing an On-Line Calendar", Proceedings of the 1978 Annual Conference, ACM, 1978, pp. 45-52.

Modi, et al., "CMRadar: A Personal Assistant Agent for Calendar Management", Department of Computer Science, Carnegie Mellon University, Springer-Verlag Berlin Heidelberg, 2005, pp. 169-181.

Schwabe Williamson & Wyatt, PC Listing of Related cases; Nov. 3, 2016; 2 pages.

\* cited by examiner

COLLABORATIVE PLATFORM FOR TEAMS WITH MESSAGING AND LEARNING ACROSS GROUPS

RELATED U.S. APPLICATION

This application is related to U.S. application Ser. No. 14/079,496, filed Nov. 13, 2013. The application is incorporated herein by reference for all purposes.

BACKGROUND

In the modern world most projects require collaboration between members of a group. Additionally, most projects are time driven with deadlines and meetings.

The calendar is essential in collaboration and group management and is the entry point to one's day and an essential tool for teams cooperating on projects. Despite the calendar's central role, and its inherent actionability as a collaborative tool, the calendar remains largely a read-only, non-actionable, non-collaborative, and non-interactive experience. In addition, current calendar applications fail to improve user experience even though event data has been entered into the calendar application repeatedly. Another short fall of current calendaring applications is that communications pertaining to events that have been calendared often require the use of separate communication applications for communication between group members that are collaboratively working on events. Additionally, current calendaring program products require users to enter most of the event information manually regardless of whether it is the first time using the calendar or it is the one-hundredth time.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The present disclosure extends to methods, systems, and computer program products for facilitating collaboration between group members via a calendaring application by enhancing communication within the group, by providing a shared group area for presenting dynamic information, and by optimizing future collaborative events based on patterns that are learned from previously encountered events and group members.

As the disclosure proceeds, reference may be made to learning and optimizing technologies that are largely the subject matter of previously filed patent applications that are incorporated herein by reference in their entireties. The patent applications primarily containing the subject matter to be incorporated by reference are namely:

U.S. patent application Ser. No. 12/632,491 filed on Dec. 7, 2009 titled ELECTRONIC ASSISTANT;

U.S. patent application Ser. No. 13/287,983 filed on Nov. 2, 2011 titled TOOLS AND TECHNIQUES FOR EXTRACTING KNOWLEDGE FROM UNSTRUCTURED DATA RETRIEVED FROM PERSONAL DATA SOURCES; and U.S. patent application Ser. No. 13/149,536 filed on May 31, 2011 titled METHOD AND APPARATUS FOR USER MODELIZATION.

It should be noted, that in the event that embodiments within the above-referenced patent applications contradict the present disclosure, it is intended that the present disclosure dominates and supersedes such embodiments.

As used herein the terms "group" and "groups" are intended to mean a plurality of people engaged on a common project or activity. A group may be based on other attributes such as location, industry, company, job title, behavior, etc. A group may comprise members that may be part of multiple groups and there may be interactions across groups. There may be many sizes of groups from large to small, but all of the groups contain a plurality of members. Groups may be represented as explicit teams and implicit teams.

As used herein "explicit team" is intended to convey one type of group that may be grouped by company domain or predefined family or other user definition.

As used herein "implicit team" may be a group based on invited or suggested participants.

As used herein "shared group area" is intended to convey a group collaboration mechanism of presenting information related to projects to team members. It should be noted that a shared group area may be digital and in certain implementations may facilitate the use of a physical area.

As used herein "collaboration group" is intended to denote a plurality of individuals and entities (sub-groups) working on a common project.

As used herein the term "event" is intended to convey a calendarable event having a plurality of participants, such as for example, a meeting.

The calendar may be the entry point for the day and is generally an essential tool for team/group collaboration on projects. Despite this central role, calendars are reduced at present to a scheduling platform for letting users create events or view them. Events can typically only be edited by the organizer and no other collaborative mechanisms are available to the participants within the calendar application. What is needed is a calendar application that provides additional collaboration.

Figure 1:
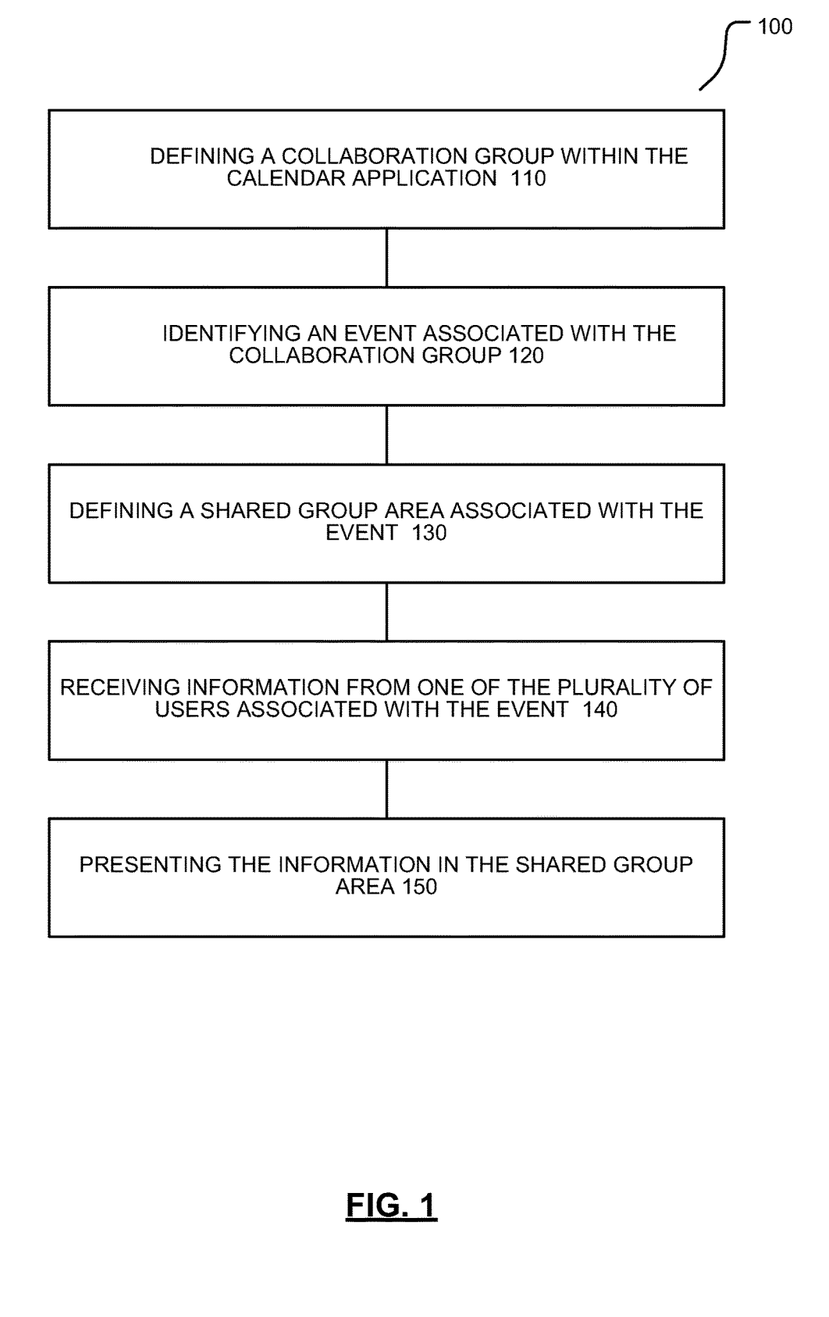
FIG. 1 illustrates an implementation of a method for collaborating through a calendar application in accordance with the technologies and features of the disclosure.

Referring now to the figures, FIG. 1 illustrates an implementation of a method for collaborating through a calendar application. As can be seen in the figure, a method of providing collaboration using a calendar application may comprise a process performed in a computing environment (300 of FIG. 3 and 200 of FIG. 2) comprising defining, using one or more processors 302, a collaboration group 222 within the calendar application 230, the collaboration group 222 including a plurality of users user 1, user 2 . . . user n at 110 of method 100. The collaboration group may be an implicit group or may be an explicit group as defined above. It should be noted that the user group may comprise members that are across, and participate in, many user groups.

At 120, identifying, using one or more processors 302 and memory 304 an event/meeting associated with the collaboration group 222. As used herein an event/meeting may be an event represented in the calendaring application for furthering a project.

At 130, using one or more processors to define a shared group area 240 associated with the event, wherein the shared group area 240 may be accessible to each of the plurality of users, user 1, user 2 . . . user n in the collaboration group 222 using the calendar application 230.

At 140, receiving over a network 208 information from one of the plurality of users, user 1, user 2 . . . user n associated with the event. In an implementation, information may be a mix of user-inputted/shared information and information automatically gathered by the application such as, information from previous events, contextual information and may even comprise data from different places, and events between different calendars that may be desirous to include.

At 150, presenting the information to the collaboration group 222, wherein the information may be retrieved from computer memory 304 in the shared group area 240. The process of presenting the information to the collaboration group 222 may be over a computer network 208, whereby the collaboration group 222, the shared group area 240, and the calendaring application 230 are connected and communicated over the network 208.

In an implementation of the method 100, information may comprise data in the form of messages, photos, documents, action items, tasks, needs, sales force and customer relation management reports, links to documents, and notes. Additionally, an implementation may comprise information in the form of meta-data of all kinds, sales force account information, links to digital documents stored on the web or cloud. It should be noted that in such an implementation the calendaring application 230 may present all data types relevant to the group in the shared group area 240.

In an implementation, the information to be presented and maintained in the shared group area 240 may be received prior to an event/meeting, during an event/meeting, or after an event/meeting having a scheduled time. This implementation will be discussed in greater detail with reference to FIG. 4 below.

An implementation may further comprise the process of identifying additional information associated with at least one related event; and importing information from that event into the current event. It should be noted that the information could be from a future event, or a tangential event, in addition to a previous event. Previous events may be associated with the same collaboration group or common members between groups. It is to be understood that additional information associated with at least one previous event may be based on at least one of event attendees, event topic, and event location.

An implementation of the shared group area 240 may comprise chat functionality within the calendar application 230 that allows each of the plurality of users in the collaboration group to chat with other users in the collaboration group. It should be under stood that the chat may be by text, voice, or video.

An implementation may comprise a collaboration group 222 that is defined for a specific time period, wherein access to the shared group area 240 may be set to expire after the specific time period has lapsed.

In an implementation a collaboration group 222 is defined based on at least one of a work relationship, an interest relationship, a family relationship, a previous collaboration group relationship, a geographic location, a job title, a job industry, a social event, and known user behavior.

In an implementation the information may be editable by users and/or may be sharable over a network to non-group members. For example, the shared group area may operate like a mobile Wiki, and may be sharable as it changes. The information may be actionable, such as, for example, the information may be highlighted by a user, the information may be marked completed or marked as read, etc. Additionally, the information may be updated automatically and displayed in the shared group area 240 as user and event attributes change. The information may be automatically updated based on time, location, email, context, etc.

It should also be noted that the information in the shared group area 240 may be accessible from various platforms and may be exported outside of the calendar application (e.g., from the web, as a plugin, via email, etc.).

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice-versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Figure 2:
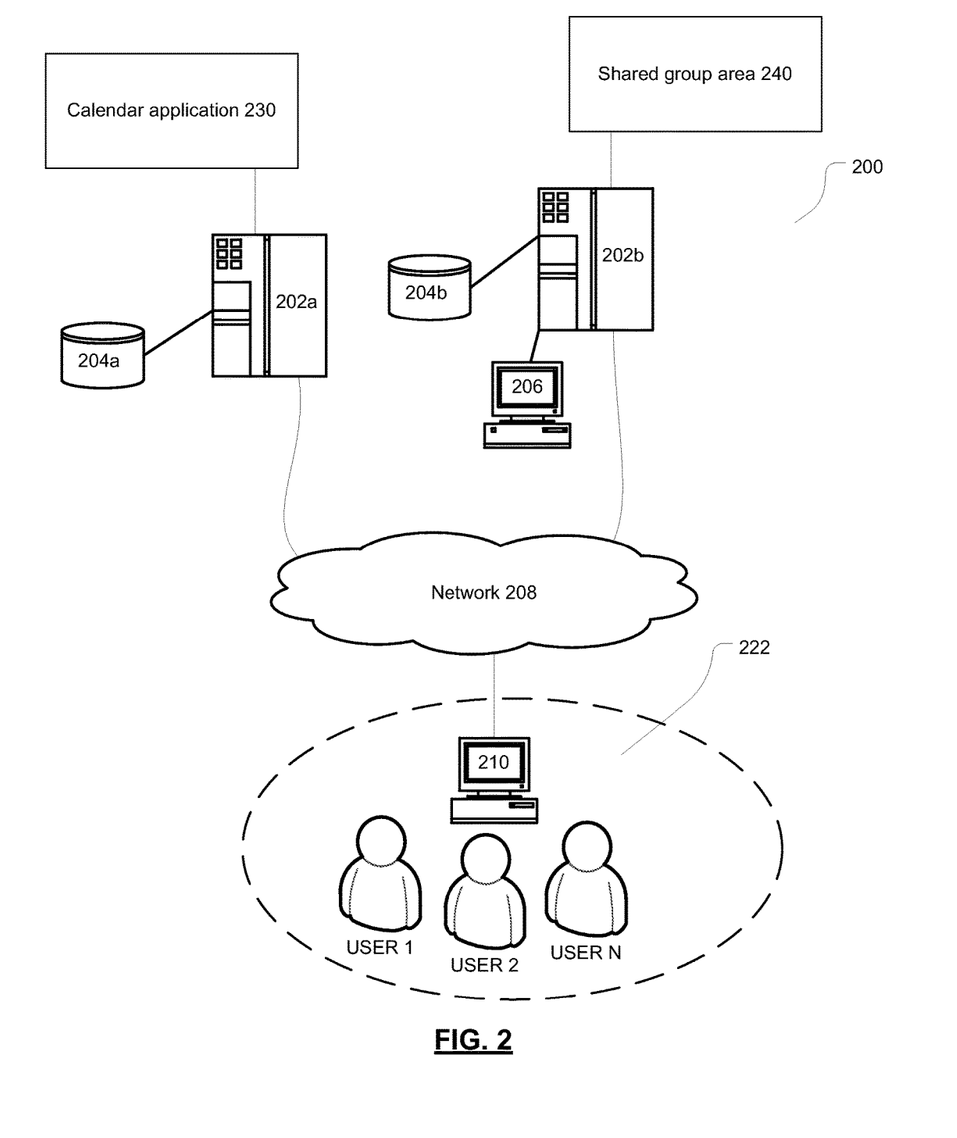
FIG. 2 illustrates an example of a computing environment suitable for implementing the methods disclosed herein and in accordance with the technologies and features of the disclosure.

FIG. 2 illustrates an example of a computing environment 200 suitable for implementing the methods disclosed herein. In some implementations, a server 202a provides access to a database 204a in data communication therewith that may facilitate a calendar application 230. The database 204a may store information and may record information such as calendar data. The database 204a may additionally store project information contained in a plurality of records for collaboration. The server 202a may provide access to the database 204a to users and groups 222 associated with a project. For example, the server 202a may implement a web server for receiving requests for data stored in the database 204a and formatting requested information into web pages that may be provided to customers during an event. The web server may additionally be operable to receive information and store the information in the database 204a and facilitate a shared group area 240.

A server 202b may be associated with a shared group area 240 providing event type data and control services as discussed herein. The server 202b may be in data communication with a database 204b. The database 204b may store information regarding various events and groups 222. In particular, information for an event may include a name, description, categorization, event, and group 222 and document data, comments, sales, past meeting data, and the like. The server 202b may analyze this data as well as data retrieved from the database 204a in order to perform methods as described herein. An operator may access the server 202b by means of a workstation 206 that may be embodied as any general purpose computer, tablet computer, smart phone, or the like.

The server 202a and server 202b may communicate over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a, 202b and databases 204a, 204b may have some or all of the attributes of a computing device and may operate the calendaring application 230. It should be noted that the calendar application 230 may be operated from any computing device within the computing environment 200.

Figure 3:
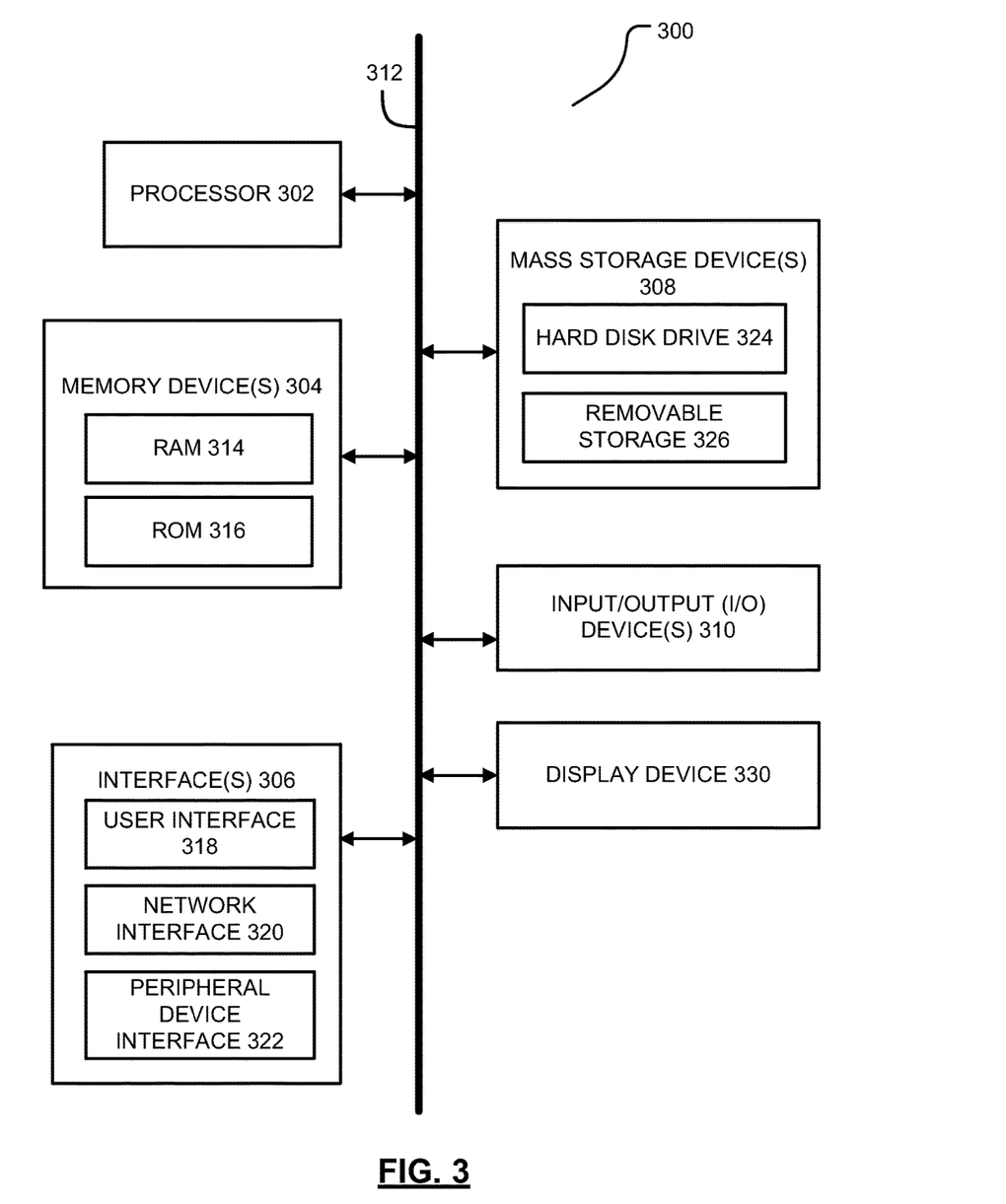
FIG. 3 illustrates a block diagram illustrating an example computing device in accordance with the technologies and features of the disclosure.

FIG. 3 illustrates a block diagram illustrating an example computing device 300. Computing device 300 may be used to perform various procedures, such as those discussed herein. Computing device 300 can function as a server, a client, or any other computing entity. Computing device 300 can perform various monitoring functions as discussed herein, and can execute one or more application programs, such as the application programs described herein. Computing device 300 can be any of a wide variety of computing devices, such as a desktop computer, a notebook computer, a server computer, a handheld computer, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 316). Memory device(s) 304 may also include rewritable ROM, such as flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments. Example interface(s) 306 may include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, or any suitable user interface now known to those of ordinary skill in the field, or later discovered), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 4:
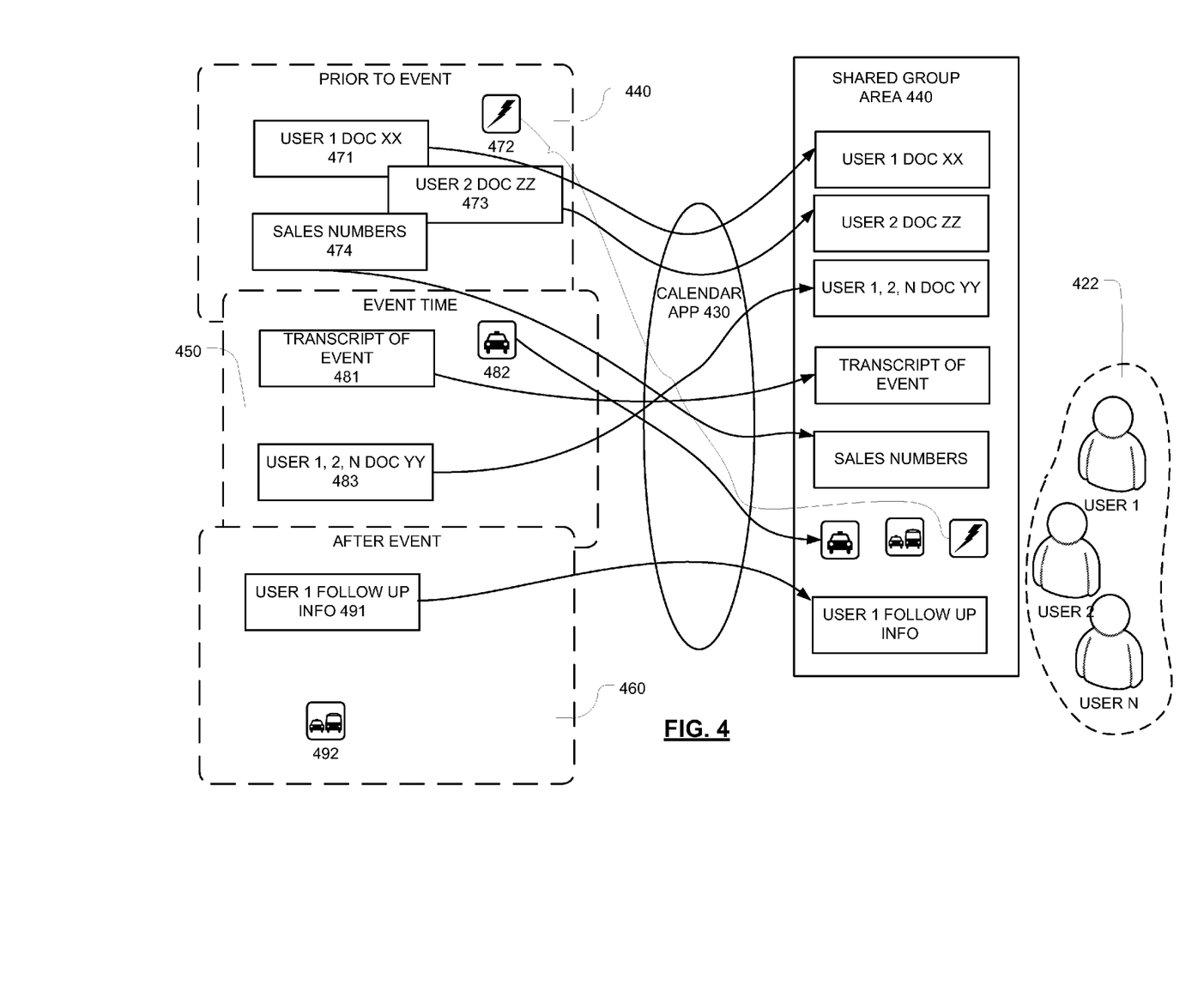
FIG. 4 illustrates a schematic of information object flow during use of the methods and systems disclosed herein as is consistent with the technologies and features of the disclosure.

FIG. 4 illustrates a schematic of data and object flow during use of the methods and system disclosed as is consistent with this disclosure. As can be seen in the figure, a calendar application 430 is central to optimizing collaboration for a group of users 422 over time. The calendar application may receive and gather data and objects prior to an event or meeting. The dashed line boxes represent relative time periods, each comprising various objects of information that relates to the group 422 and the project of the group. It should be noted that information may be in many forms. For example, information may be: notes, documents, statistical reports, sales numbers, links, multi-media, user information, mission statements, programs and applications, transcripts of previous events and events, and other objects that would be useful to the group 422.

As is illustrated in the first dashed box, prior to a meeting or event there may be various objects of information that would be useful to the group, such as documents 471, 473 created by group members, an image 472, and a report of sales numbers 474. In the schematic the calendar application 430 causes the gathering of the information objects and projects them on to a shared group area 440 so that all of the members of the group 422 have access to the information objects in the shared group area 440. The shared group area can be imagined, or realized, to be an information wall as is commonly used in computer communities. The calendar application may be analyzed and qualify the information objects using various learning and threshold methods in making a determination of what should be included in the shared group area 440. The arrow pathways illustrate the flow of information items into the shared group area 440 as directed by the calendaring application.

Aspects of the information objects may be tracked and facilitated by the calendaring application using the natural time awareness that calendars provide. For example, as an event is scheduled within the calendar application, existing information objects related to the event are automatically gathered by the calendar application and may be included in the shared group area 440. Additionally, as the event is being held, information objects may be generated and further information may be sought. The time frame representing the event is illustrated by a second dashed line box comprising: a transcript 481, a media item 482, and an additional user document 483. Again, the calendar application 430 may gather the information produced concurrently with the event and may present it within the share group area 440.

Similarly, information items 491, 492, which may be generated after the event, may be gathered and presented on the shared group area 440. As before, the calendaring application 430 is central in gathering the information items and then presenting those information items within the shared group area 440. As is illustrated, the information items and objects may be presented with various organizational preferences. For example, the calendar application 430 may place the items in the shared group area 440 dependent on the type of information object, or it may present the information items in chronological order, etc.

In an implementation, the users may or may not be granted permissions to edit the shared group area 440. Permissions may be granted to some group members and not others.

For each event on the user's calendar, the calendar application may create a dedicated shared group area 440. For events with no invited attendees, that area is only accessible to the user, who can decide to share part or all of it with other users. For events with one or more invited attendees, the shared group area 440 is accessible to all attendees. Edit rights are in the control of the organizer who can make it read-only or editable for other attendees. Sub-event/meeting spaces with a subset of the event attendees can also be created.

The shared group area may comprise an event wall digital structure for displaying information as discussed herein. However, other forms may be used for presenting information to group members and as such presenting information will generically be referred to as being presented in the shared user area.

One of the features of the shared group area 440 is an event wall where participants can share messages and documents related to the event. The event wall functions as a chat platform where users can instantly share and publish messages, documents, photos and notes, before, during and after the event. Examples of messages include quick notes from participants (e.g., "I am running behind"; "Meeting moved to Conference Room A"; "Please bring the projector" etc.), meeting notes, to-dos, action-items, URLs etc. Documents include slides being presented, photos of the whiteboard and more.

Users can post practically anything in the shared group area via this event wall, such as links to web pages and the like. It could reside in the event summary itself or in a new notification user interface, where a person can see what has been posted such that the event wall may be effectively crowd-sourced source for event details. It may also leverage the calendar application that is being used by the different users so that they can share that information out to the group through the appropriate application.

In an implementation, the shared group area and event wall may be shared, published or uploaded in parts or in whole. Additionally, the shared group area may be searchable. Furthermore, for recurring events, the shared group area/event wall of previous events in the series can be accessed from the current event via a "load more" functionality.

In implementation, the shared group area may be present and accessible from different screens (desktop, mobile, tablet) and there may be a mechanism to see a timeline or events/meetings in the past, etc. Information from previous events can also be automatically brought into future events based on event attendees, topic of the event, location of the meeting, etc. to bring context to the current event. In an implementation, information and content could also co-exist on different event walls, and/or may be pinned if it is a recurring event.

In an implementation, users can upload documents thereby having them ready for an event or keeping track of them for the future. Additionally, the documents may be shared with some or all of the event attendees. The documents may be browsable and searchable, and they may also be automatically brought into future events based on context as determined by the calendar application 430. As discussed above, the document may come from various data sources that may be accessed by the calendar application.

An implementation may further comprise the functionality of being able to share with external non-calendar application users from the calendar application, much like an export feature or the like.

Figure 5:
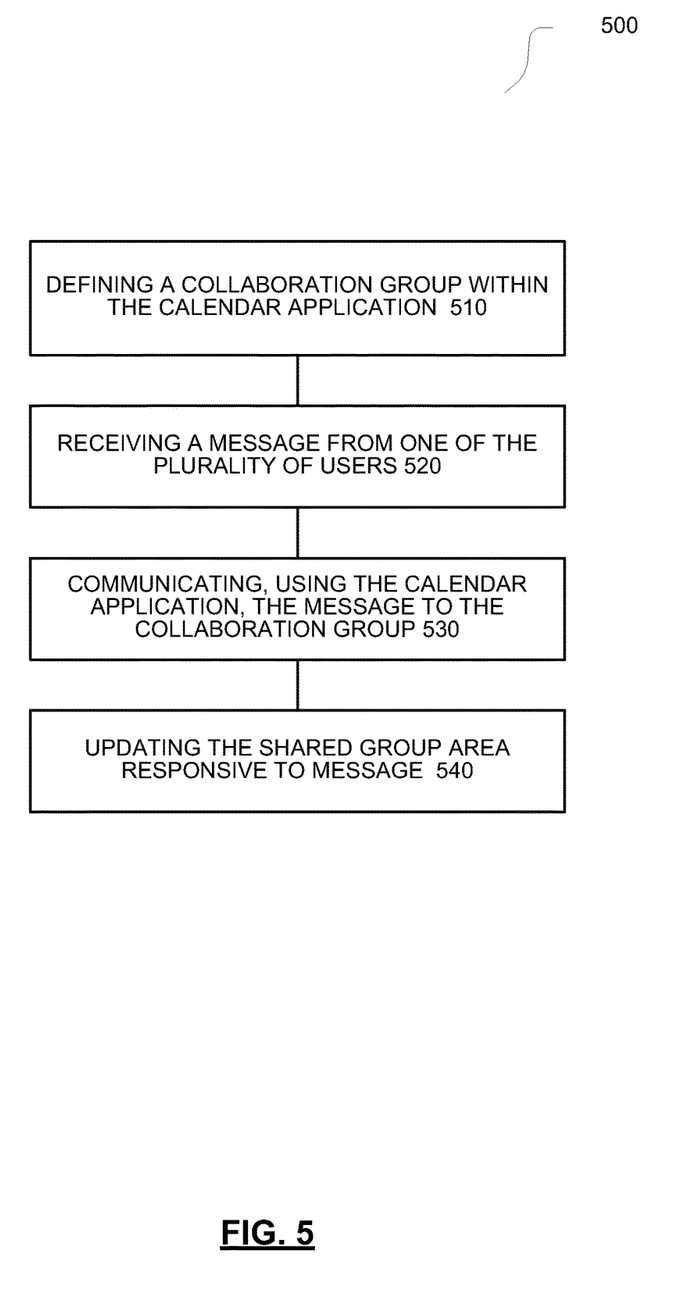
FIG. 5 illustrates an embodiment of a method for including time relevant messaging within a shared group area as facilitated by a calendaring application.

FIG. 5 illustrates an embodiment of a method for including time relevant messaging within a shared group area as facilitated by a calendaring application. In addition to sharing information items, contemporaneous messages from group members may occur relative to the event, as the calendar application may facilitate communication between the application users. In some implementations Email and SMS notifications may be sent directly from within the calendar application such that for non-calendar application users, documents and messages are received by traditional Email and/or SMS programs. As is illustrated in the figures, the messages from users may comprise arrival information, time information and location information that is particularly important in collaboration events.

At 510 of method 500, a collaboration group may be defined by the operation of computer processors and memory within a computing environment and within a calendar application 630 (of FIG. 6), the collaboration group 622 (of FIG. 6) including a plurality of users user 1, user 2 . . . user n. The collaboration group may be an implicit group or may be an explicit group as defined above. It should be noted that the user group may comprise members that are across, and participate in, a plurality of user groups.

Figure 6:
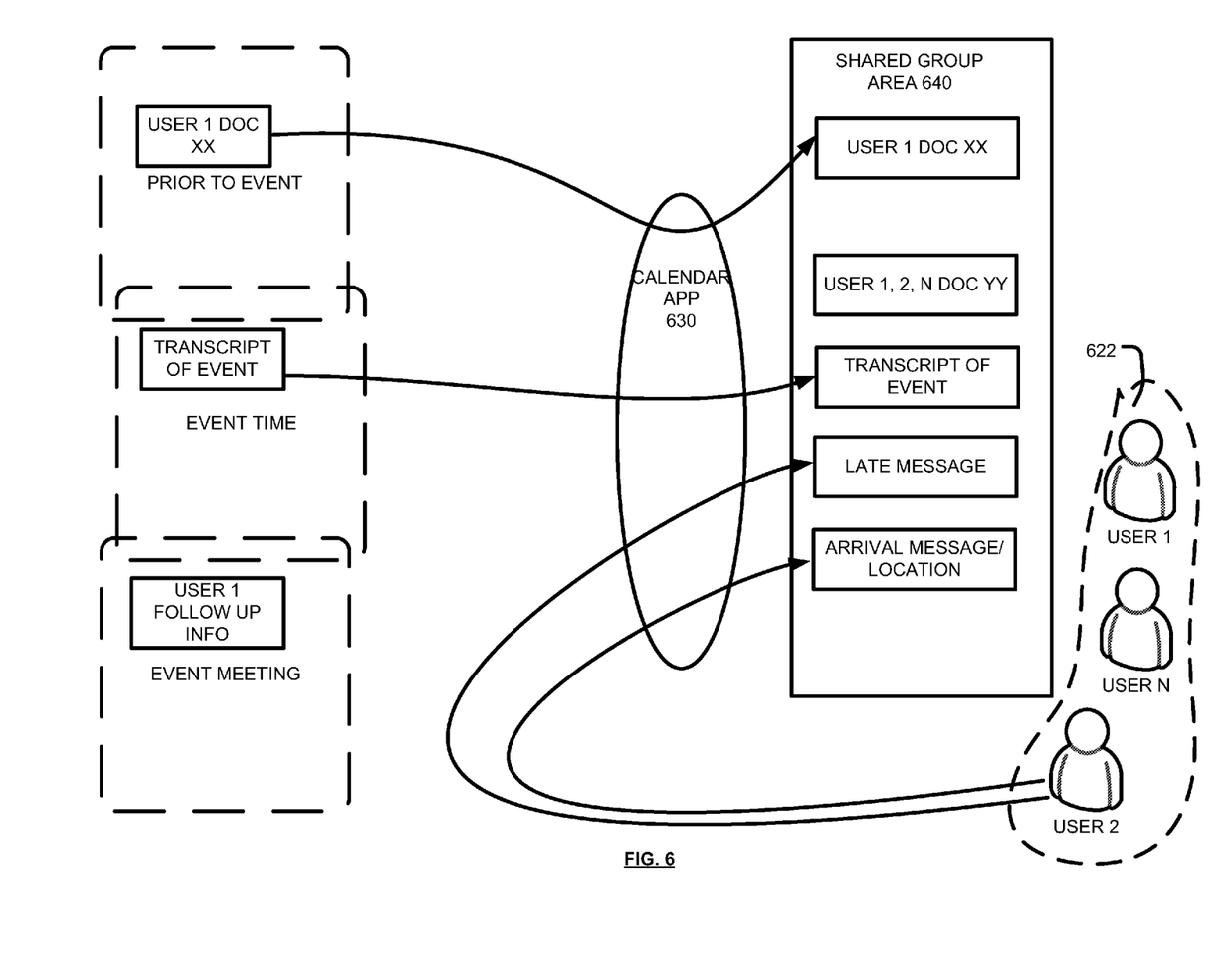
FIG. 6 illustrates a schematic of information object flow during use of the methods and systems disclosed herein as is consistent with the technologies and features of the disclosure.

At 520, receiving a message from at least one of the plurality of users within the group 622. In the figure, the flow of messages from the users through the calendar application 630 into the shared group area 640 are represented by the flow lines emanating from User N.

Notifications of all kinds may also be presented within the shared group area so as to appear on a wall or other streamed mechanism thereby being accessed by the group. For example, the information shared may also include various types of multimedia such as conference calls, voice mail, text to speech, video, video streams, dedicated mediums for blind and deaf participants, and foreign language translations. An implementation may comprise a message that is related to at least one of attendees at an event, running late to an event, an event reminder, an event announcement, an event change, an event confirmation, a follow-up event, and a user location.

At 530 of method 500, communicating the message received at 520 to the other users of the collaboration group 622, using the calendar application within a computing environment. For example, a chat session may be initiated by the calendar application 630 with the users of the collaboration group 622 in order to convey the message. In an implementation, chat sessions within the group can be facilitated directly by the calendar application such that users do not have to switch applications to do so. This is especially beneficial with scheduling because it can be done without having to switch over to an Email program, and users can stay within the calendar application.

At 540 of method 500, the information within the shared group area 640 may be updated with the content of the message and any follow messages from other users. Accordingly, the disclosure describes methods and systems for providing contemporaneous communication between group members through a calendar application that inherently provides temporal scheduling functionality.

Figure 7:
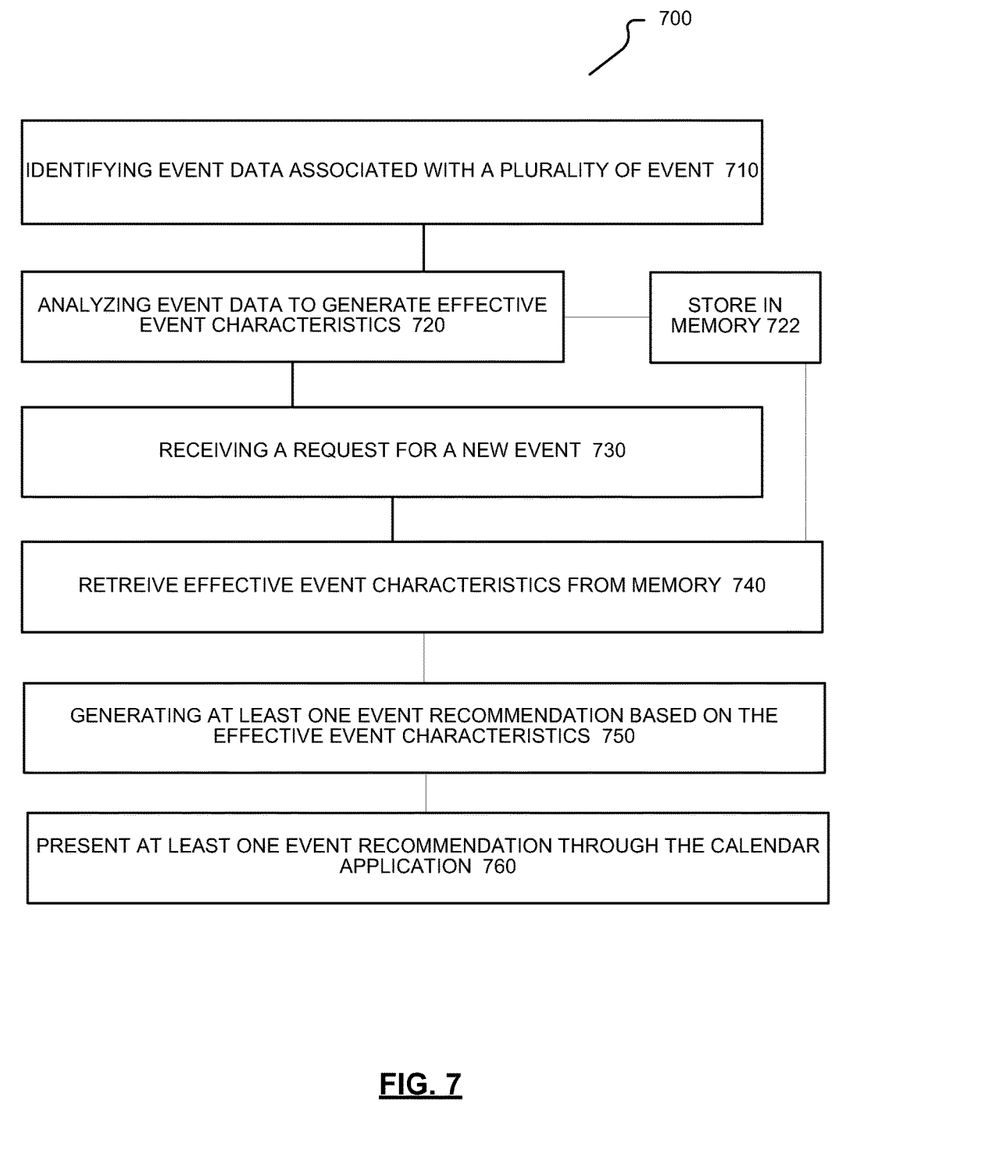
FIG. 7 illustrates a method for providing automatic event preferences through a calendaring application based on previous event and group member preferences as is consistent with the technologies and features of the disclosure.

FIG. 7 illustrates a method 700 for providing automatic event preferences through a calendaring application based on previous event and group member preferences. In an implementation of a calendaring application, relative information objects, agendas, action items etc. are identified and recorded into computer memory. In an implementation, the system may learn desired preferences over time and with additional usage as more members of the team use the system a knowledge database may be created in the form of a group model which may be used alongside each individual's user model (as disclosed in the U.S. patent application titled "Method & Apparatus For User Modelization").

At 710 of method 700, identifying using one or more processors event data associated with a plurality of events. The plurality of events may be concurrent events, past events and/or events wherein attendees have been known to participate in.

At 720 of method 700, learning, using one or more processors, the event data to generate effective event characteristics. For example, effective event characteristics from a plurality of events may be categorized, correlated and then stored in computer memory at 722.

At 730, receiving from a user over a network or through a user interface of a calendaring application a request for a new event.

At 740, retrieving from memory the effective event characteristics stored in memory at 722.

At 750, generating at least one event recommendation based on the effective event characteristics stored in memory at 722.

At 760, present at least one event recommendation through the calendar application. In an implementation, the event recommendations may be presented through a shared group area so as to be seen by a plurality of users in the corresponding group.

It should be noted that as the method is used more, the better it works. As the database increases in the number of data points therein, the more accurate the recommendations will be. As it is used within an ongoing group/team, the calendar application learns across more users to improve the accuracy and relevance of its suggestions. In an implementation, the learning and the recommendations may correspond to such event characteristics including event locations (e.g., conference rooms), dial-in patterns, related documents and Emails, etc.

Additionally, in an implementation the learning can be transferred across users so as to provide recommendations based on all of the users in a group. In should be noted that new users and group members can be bootstrapped in for the first-use experience. Examples of the types of learning from groups include implicit learning from group activity and explicit learning from group activity.

Implicit learning from group activity. For example, if within the invited set of participants are selecting a particular suggested location that they are all seeing, this may indicate that it is the correct location suggestion and the system can store an indicator in memory for later use. This learning can be shared across the calendar application to the other invited or suggested participants.

Explicit learning from group activity. For example, an attendee or someone within the same implicit or explicit group may specify a preference so as to teach the calendar application. The user may state that Joe Smith is the Office Administrator. This knowledge will translate across the system for that group and may influence the algorithms to determine what Emails are related since the system knows that Joe is an internal employee and manages executives' calendars. Additionally, the method may include ranking a particular suggested document higher in a shared group area, and/or even pinning that document to the event.

In an implementation, the learning may be done in advance and may be presented as a template or profile that is pre-completed. For example, a user at a company may specify the names of meeting rooms in the database so that all later users may have a better experience because the system will know that something is a physical room rather than keywords for suggesting an alternate location.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method of operating a collaboration platform using a calendar application, the method comprising:
   identifying, with the calendar application, information about an event;
   determining, by the calendar application, a context based on the information and using a learning system;
   defining a collaboration group within the calendar application based on the determined context, wherein said defining includes identifying a plurality of users based on the determined context;
   defining, with the calendar application, a shared group area associated with the event, the shared group area being displayed and accessible to each of the plurality of users in the collaboration group;
   receiving, with the calendar application, information from one of the plurality of users associated with the event, wherein the information includes an object;
   displaying, with the calendar application, the object in the shared group area;
   receiving, with the calendar application, a message from one of the plurality of users associated with the event; and
   displaying, with the calendar application, the message with the object in the shared group area.

2. The method of claim 1, further comprising:
   receiving, with the calendar application, an additional object from a same or different one of the plurality of users in the collaboration group; and
   displaying, with the calendar application, the objects, and the message within the shared group area.

3. The method of claim 1, further comprising:
   receiving, with the calendar application, a time indicator from one of the plurality of users;
   setting, with the calendar application, an expiration time for the shared group area based on the time indicator; and
   terminating, with the calendar application, access to the shared group area by the collaboration group based on the expiration time.

4. The method of claim 1, further comprising:
selecting an object to display in the shared group area based on the determined context, wherein the selected object is different than the object of the information received from the user of the plurality of users.

5. The method of claim 4, further comprising:
relating another event to the event responsive to the context determination;
wherein the object is selected responsive to said relating; and
wherein the information about the event includes at least one of event attendees, event topic, and event location.

6. The method of claim 5, wherein the related event is associated with the collaboration group.

7. The method of claim 4, further comprising:
displaying, with the calendar application, the objects in the shared group area;
communicating the objects in the shared group area to each of the plurality of users in the collaboration group.

8. The method of claim 1, further comprising providing chat functionality within the calendar application that displays chat sessions between the plurality of users in the collaboration group within the shared group area.

9. The method of claim 1, wherein the collaboration group is defined for a specific time period.

10. The method of claim 1, wherein the collaboration group is defined based on at least one of a work relationship, an interest relationship, a family relationship, a previous collaboration group relationship, a geographic location, a job title, a job industry, and known user behavior.

11. The method of claim 4, further comprising:
displaying, with the calendar application, the objects in the shared group area;
wherein the objects in the shared group area are editable by the users in the collaboration group.

12. The method of claim 4, further comprising:
displaying, with the calendar application, the objects in the shared group area;
wherein the objects in the shared group area are sharable over a network.

13. The method of claim 4, further comprising:
displaying, with the calendar application, the objects in the shared group area;
wherein the objects are actionable by at least one of highlighting, sharing, forwarding, and completion marking.

14. The method of claim 4, further comprising:
displaying, with the calendar application, the objects in the shared group area; and
updating at least one of the objects displayed in the shared group area as attributes change for the users and the event.

15. A memory device coupled to a processing system having instructions stored thereon for operating a calendar application, the instructions, in response to execution by the processing system, performing operations comprising:
identifying information about an event;
determining a context based on the information and using a learning system;
performing at least one of defining a collaboration group within the calendar application based on the determined context, wherein said defining includes identifying a plurality of users based on the determined context or selecting an object based on the determined context;
defining a shared group area associated with the event, the shared group area being displayed and accessible to each of the plurality of users in the collaboration group and including the object if selected;
receiving a message from one of the plurality of users, wherein the message is associated with the collaboration group;
communicating the message to the plurality of users in the collaboration group; and
presenting the message within the shared group area.

16. The memory device of claim 15, wherein communicating the message to the plurality of users includes at least one of emailing the message, texting the message, and sending the message via a short message service (SMS).

17. The memory device of claim 15, wherein presenting the message within the shared group area comprises displaying the message on a webpage.

18. The memory device of claim 15, further comprising:
relating another event to the event responsive to the context determination;
wherein the selection of the object is responsive to said relating and the object corresponds to said another event.

19. The memory device of claim 15, wherein the message is related to at least one of event attendance, notification associated with running late, an event reminder, an event announcement, an event change, an event confirmation, a follow-up event, and a user location.

20. A computer system, comprising:
a processing system; and
a memory device coupled to the processing system having instructions stored thereon for operating a calendar application, the instructions, in response to execution by the processing system, being operable to:
identify information about an event;
determine a context based on the information and using a learning system;
perform at least one of defining a collaboration group within the calendar application based on the determined context, wherein said defining includes identifying a plurality of users based on the determined context or selecting an object based on the determined context;
define a shared group area associated with the event, the shared group area being displayed and accessible to each of the plurality of users in the collaboration group and including the object if selected;
receive messages from the users in the collaboration group associated with the event;
display the messages in the shared group area;
receive an expiration time for the shared group area from one of the users; and
terminate access by the collaboration group to the shared group area and the messages based on the expiration time.

21. The computer system of claim 20, wherein the instructions are further operable to:
receive an object from the users in the collaboration group associated with the event;
display the object from the users within the shared group area;
wherein the messages and the object from the users are a portion of user-selected information;
relate another event to the event responsive to the context determination;
wherein the selected object is a portion of information selected responsive to said relating and the selected object is of user-specified information of said another event.

* * * * *